(12) United States Patent
Zheng

(10) Patent No.: US 9,158,335 B2
(45) Date of Patent: Oct. 13, 2015

(54) NOTEBOOK COMPUTER

(71) Applicant: NVIDIA Corporation, Santa Clara, CA (US)

(72) Inventor: Wenjie Zheng, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 130 days.

(21) Appl. No.: 13/668,039

(22) Filed: Nov. 2, 2012

(65) Prior Publication Data

US 2014/0035820 A1    Feb. 6, 2014

(30) Foreign Application Priority Data

Aug. 6, 2012    (CN) .......................... 2012 1 0277306

(51) Int. Cl.
*G06F 1/16* (2006.01)
(52) U.S. Cl.
CPC ............ *G06F 1/1626* (2013.01); *G06F 1/1632* (2013.01); *G06F 1/1679* (2013.01)
(58) Field of Classification Search
CPC ... G06F 1/1613; G06F 1/1615; G06F 1/1616; G06F 1/1654; G06F 1/1679; G06F 1/1681; G06F 1/1683
USPC ........................................ 361/679.29, 679.59
See application file for complete search history.

(56) References Cited

U.S. PATENT DOCUMENTS

| | | | | |
|---|---|---|---|---|
| 5,319,582 | A * | 6/1994 | Ma | 345/169 |
| 5,355,279 | A * | 10/1994 | Lee et al. | 361/679.09 |
| D358,374 | S * | 5/1995 | Yamazaki et al. | D14/320 |
| 6,256,192 | B1 * | 7/2001 | Shannon | 361/679.06 |
| 6,351,372 | B1 * | 2/2002 | Kim | 361/679.15 |
| 6,512,670 | B1 * | 1/2003 | Boehme et al. | 361/679.29 |
| 6,530,784 | B1 * | 3/2003 | Yim et al. | 439/31 |
| 6,768,635 | B2 * | 7/2004 | Lai et al. | 361/679.11 |
| 6,980,420 | B2 * | 12/2005 | Maskatia et al. | 361/679.57 |
| 7,061,472 | B1 * | 6/2006 | Schweizer et al. | 345/168 |
| 7,136,282 | B1 * | 11/2006 | Rebeske | 361/679.55 |
| D535,292 | S * | 1/2007 | Shi et al. | D14/315 |
| 7,471,506 | B2 * | 12/2008 | Yin | 361/679.55 |
| 7,599,178 | B2 * | 10/2009 | Huang et al. | 361/679.43 |
| 7,686,261 | B2 * | 3/2010 | Shi et al. | 248/166 |
| 7,936,559 | B2 * | 5/2011 | Chen | 361/679.27 |
| 8,199,476 | B2 * | 6/2012 | Tian et al. | 361/679.29 |
| 8,203,832 | B2 * | 6/2012 | Szabolcsi | 361/679.06 |
| 8,238,085 | B2 * | 8/2012 | Wu et al. | 361/679.17 |
| 8,498,100 | B1 * | 7/2013 | Whitt et al. | 361/679.17 |
| 8,625,263 | B2 * | 1/2014 | Pu et al. | 361/679.17 |
| 8,644,018 | B2 * | 2/2014 | Hung | 361/679.41 |
| 8,730,669 | B2 * | 5/2014 | Locker et al. | 345/169 |
| 2007/0091552 | A1 * | 4/2007 | Liang et al. | 361/681 |
| 2011/0037701 | A1 * | 2/2011 | Wang | 345/169 |
| 2013/0229773 | A1 * | 9/2013 | Siddiqui et al. | 361/679.59 |

* cited by examiner

*Primary Examiner* — Anthony Q Edwards
(74) *Attorney, Agent, or Firm* — Zilka-Kotab, PC

(57) ABSTRACT

A notebook computer is disclosed in the present invention which comprises: a screen, which is a touch screen configured to be operable via touching; a host, which is integrated in the screen; and a keyboard, which is detachably connected with the screen so that the keyboard and the screen can be in a state of being connected to each other or in a state of being separated from each other in use. When the notebook computer is used, the keyboard and the screen can be in the state of being separated from each other in use, so that the screen and the keyboard of the notebook computer are used separately. And the keyboard and the screen can be separated when needed and the notebook computer can be use by touching operation on the screen.

18 Claims, 8 Drawing Sheets

NOTEBOOK COMPUTER

CROSS-REFERENCE TO RELATED APPLICATION

This application claims priority to Chinese Patent Application No. 201210277306.2, filed on Aug. 6, 2012, which is hereby incorporated by reference in its entirety.

FIELD OF INVENTION

The present invention relates generally to computer technology, in particular, to notebook computer.

BACKGROUND

In the current notebook computer, the keyboard is integrated with the host and connected to the main board by data wires, and the keyboard is pivotally connected to the screen so as to form the whole notebook computer. However, sometimes (such as in a small meeting or when showing products, items to clients) the users wish to use the screen and the keyboard separately to operate the keyboard and view the screen at different locations. In addition, the users also wish to separate the keyboard and the screen and perform touch-operation of the notebook computer on the screen individually.

Therefore, there is a need of providing a notebook computer to solve the above problems.

SUMMARY OF THE INVENTION

In order to solve the above-mentioned problems, a notebook computer is provided in the present invention which comprises: a screen, which is a touch screen configured to be operable via touching; a host, which is integrated in the screen; and a keyboard, which is detachably connected with the screen so that the keyboard and the screen can be in a state of being connected to each other or in a state of being separated from each other in use.

Preferably, the notebook computer further comprises a pivoted member which is pivotedly provided at the keyboard to be connected with the screen while the keyboard and the screen are in the state of being connected to each other.

Preferably, the notebook computer further comprises a locking member for locking the pivoted member with the screen while the keyboard and the screen are in the state of being connected to each other.

Preferably, a first snap-fit part is provided on the pivoted member; a second snap-fit part is provided on the screen; the first snap-fit part is snap-fitted to the second snap-fit part while the keyboard and the screen are in the state of being connected to each other.

Preferably, a backup power source is provided in the keyboard, and a backup power source interface connected to an output terminal of the backup power source is provided in the first snap-fit part; a power source receiving interface connected to the host is provided in the second snap-fit part; the backup power source interface is inserted and connected to the power source receiving interface while the keyboard and the screen are in the state of being connected to each other.

Preferably, a control circuit is provided in the keyboard, and a keyboard data interface connected to the control circuit is provided in the first snap-fit part; a host data interface connected to the host is provided in the second snap-fit part; the keyboard data interface is inserted and connected to the host data interface while the keyboard and the screen are in the state of being connected to each other.

Preferably, a backup power source and a control circuit are provided in the keyboard, and a keyboard transmission interface connected to both an output terminal of the backup power source and the control circuit is provided in the first snap-fit part; a host transmission interface connected to the host is provided in the second snap-fit part; the keyboard transmission interface is inserted and connected to the host transmission interface while the keyboard and the screen are in the state of being connected to each other.

Preferably, the first snap-fit part is a snap-fit slot; the second snap-fit part is the bottom-side part of the screen; the bottom-side part of the screen is snap-fitted within the snap-fit slot while the keyboard and the screen are in the state of being connected to each other.

Or preferably, the first snap-fit part includes two projections projecting radially from two ends of the pivoted member respectively, the projections are made of elastic material, and free ends of the two projections are each provided with a hook with the two hooks facing away from each other; the second snap-fit part includes two L-shaped through-holes provided at two ends of the bottom-side part of the screen respectively, the L-shaped through-hole includes a first opening located on the bottom side of the screen and a second opening located on the lateral side of the screen; each of the projections is snap-fitted into the respective L-shaped through-hole and each of the hooks is hooked at the outside of the respective second opening while the keyboard and the screen are in the state of being connected to each other.

Or preferably, the first snap-fit part includes two projections projecting radially from two ends of the pivoted member respectively, and free ends of the two projections are each provided with a hook with the two hooks facing toward each other; the second snap-fit part includes two recesses provided at two ends of the bottom-side part of the screen respectively, wherein each of the recesses includes: a first wall, which is a portion of the lateral-side part of the screen; a second wall, which extends in parallel with the first wall, with a groove opened toward the first wall provided in the second wall; a biasing means, which is located in the groove, with one end fixedly connected to the groove; and a snap-fit plate, with one end of the snap-fit plate located within the groove and connected with the other end of the biasing means, and the other end of the snap-fit plate passing through the first wall and extending out of the lateral-side part of the screen, wherein a snap-fit hole is provided on the snap-fit plate, while the keyboard and the screen are in the state of being connected to each other, each of the projections is snap-fitted into the respective snap-fit hole and each of the hooks is hooked at the surface of the respective snap-fit plate.

Preferably, data are transmitted between the host and the keyboard through wireless connection.

Preferably, while the keyboard and the screen are in the state of being connected to each other, the keyboard and the screen can rotate relative to each other, and a rotation limiter is provided on the keyboard or the screen such that the range of the angle between the screen and the keyboard is 0-180 degree.

Preferably, the notebook computer further comprises a bracket such that the bracket supports the screen while the keyboard and the screen are in the state of being separated from each other.

Preferably, the bracket is articulated on the screen.

Preferably, a rotating limiter is provided on the screen or the bracket such that the range of the angle between the bracket and the screen is 0-90 degree.

Preferably, the notebook computer further comprises a bracket locking means, which is used to fix the bracket to the screen while the keyboard and the screen are in the state of being connected to each other.

Preferably, the bracket is detachably connected with the screen.

Preferably, the bracket is made of heat dispersing material.

Preferably, a touch screen operation switching key is provided on the keyboard for canceling or starting a touching operation function of the screen; a keyboard operation switching key is provided on the screen for canceling or starting a operation function of the keyboard.

Preferably, a touch panel is provided on the top surface of the keyboard, and a USB data interface is provided on the side of the keyboard.

Following are the effectiveness of the present invention:

In the present notebook computer, the host is integrated in the screen rather than in the keyboard, and the keyboard is detachably connected with the screen, no that the keyboard and the screen can be in a state of being connected to each other or in a state of being separated from each other in use. Thus, the keyboard and the screen can be in the state of being separated from each other in use, so that the screen and the keyboard of the notebook computer are used separately. In addition, in the notebook computer, the host is integrated in the screen which is operable via touching, and the keyboard and the screen are detachable, such that the keyboard and the screen can be separated when needed and the notebook computer can be use by touching operation on the screen.

A serial of simplified conceptions are incorporated into the summary of the invention, which will be further described in more detail in the detailed description. The summary of the invention neither implies that it is intended to limit the essential features and necessary technical features of the technical solution to be protected, nor implies that it is intended to define the protection scope of the technical solution to be protected.

Advantages and features of the present invention will be described in detail below in connection with the accompanying drawings.

BRIEF DESCRIPTION OF THE DRAWINGS

The following drawings of the present invention as apart of the present invention herein are used for understanding of the present invention, the implementations and the descriptions thereof are illustrated in the drawings for explaining the principle of the present invention. In the drawings.

DETAILED DESCRIPTION

A plenty of specific details are presented so as to provide more thoroughly understanding of the present invention in the description below. However, the present invention may be implemented without one or more of these details, as is obvious to those skilled in the art. In other examples, some of the technical features known in the art are not described so as to avoid confusions with the present invention.

Detailed structures will be presented in the following description for more thoroughly appreciation of the invention. Obviously, the implementation of the invention is not limited to the special details well-known by those skilled in the art. Preferred embodiments are described as following, however, the invention could also comprise other ways of implementations.

Figure 1:
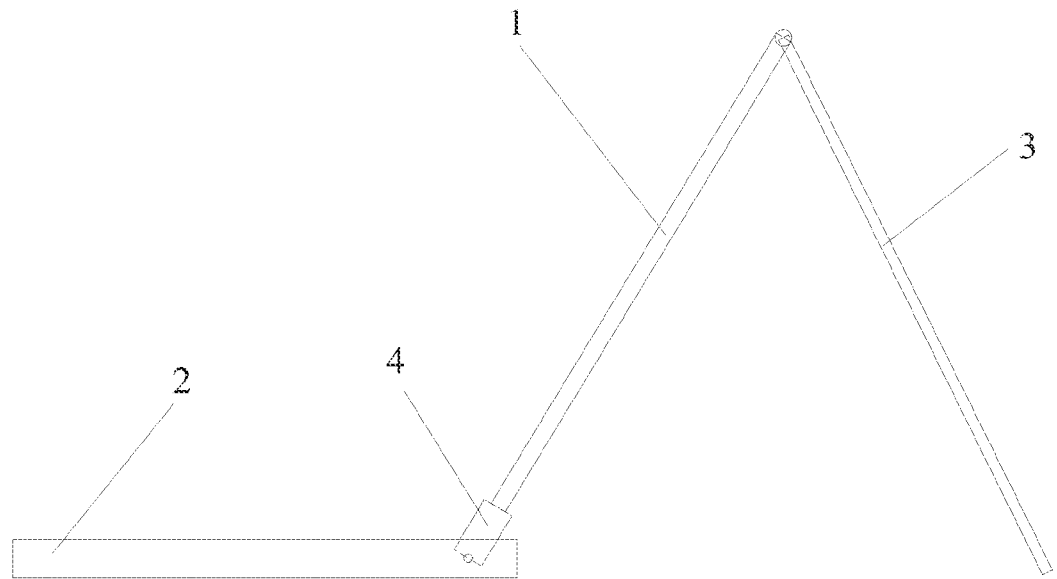
FIG. 1 illustrates a schematic side elevational view of the notebook computer in accordance with the first embodiment of the present invention.

As shown in FIG. 1, the notebook computer according to the first embodiment of the present invention comprises a screen 1, a host (not shown) and a keyboard 2. The screen 1 is a touch screen which is operable via touching, and the host is integrated in the screen 1. The keyboard is detachably connected with the screen 1, so that the keyboard 1 and the screen 1 could be in a state of being connected to each other or in a state of being separated from each other in use. The term "detachably" in the present invention means that the user of the notebook computer may separate/mount the keyboard and the screen from/to each other easily with hand and without tools, rather than the complicated detaching process by means of tools. Furthermore, in the present embodiment, it is preferably that the screen 1 and the keyboard 2 can rotate relative to each other while the keyboard 2 and the screen 1 are in the state of being connected to each other, as common notebook computer.

It can be understand that the above mentioned notebook computer can enable the keyboard 2 and the screen 1 to be in the state of being separated from each other in use, so that the screen 1 and the keyboard 2 of the notebook computer are used separately. Thus, the screen 1 and the keyboard 2 of the notebook computer can be separated by a certain distance to facilitate operation of the keyboard and watching of the screen, in e.g. a small meeting of two or three people, or when a salesman demonstrates a product item to one to two client(s). In addition, in the notebook computer, the host is integrated in the screen 1 which is operable via touching, and the keyboard 2 and the screen 1 are detachable, such that the keyboard 2 and the screen 1 can be separated when needed (e.g. when taking a train), at this time, the screen 1 in which a host is integrated becomes a panel computer and the user can use the panel computer by touch-operating the screen 1.

Preferably, the notebook computer of the present embodiment further comprises a pivoted member 4 which is pivotedly provided at the keyboard 2 to be connected with the screen 1 while the keyboard 2 and the screen 1 are in the state of being connected to each other, as seen from FIG. 1. It can be understand that the pivoted connection between the keyboard 2 and the screen 1 is achieved through the pivoted connection between the pivoted member 4 and the keyboard 2 as well as the connection between the pivoted member 4 and the screen. Of course, the pivoted member 4 may also be provided at the screen 1 to be connected with the keyboard 2 in practice, however, the provision of the pivoted member 4 at the keyboard 2 can ensure that the structure of the screen 1 is simpler and the operation thereof is more convenient when the keyboard 2 and the screen 1 are detached from each other.

Mutual detachably fixed connection between the pivoted member 4 and the screen 1 could be achieved through various ways. For example, the notebook computer can also comprise various appropriate common locking members for locking the pivoted member 4 with the screen 1 while the keyboard 2 and the screen 1 are in the state of being connected to each other.

Figure 2:
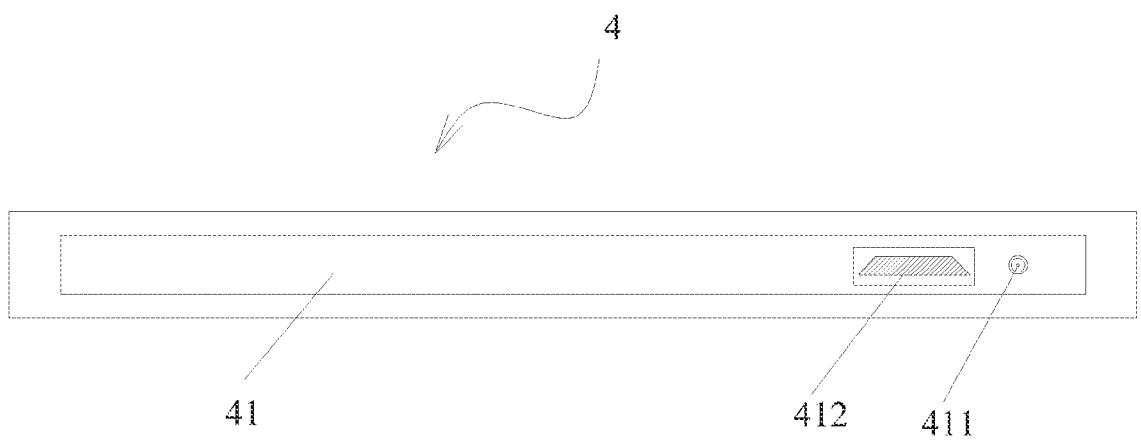
FIG. 2 illustrates a schematic rear view of the pivoted member of the notebook computer in accordance with the first embodiment of the present invention.
Figure 3:
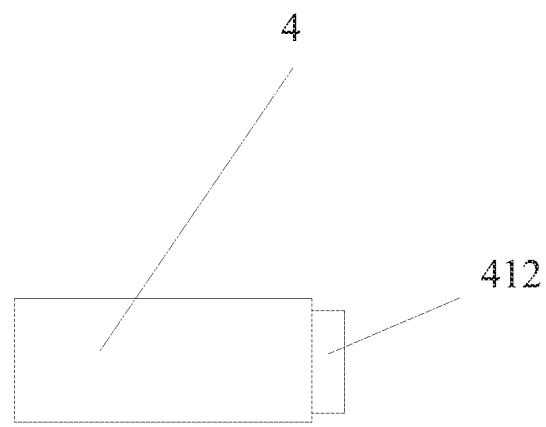
FIG. 3 illustrates a schematic side elevational view of the pivoted member of the notebook computer in accordance with the first embodiment of the present invention.
Figure 4:
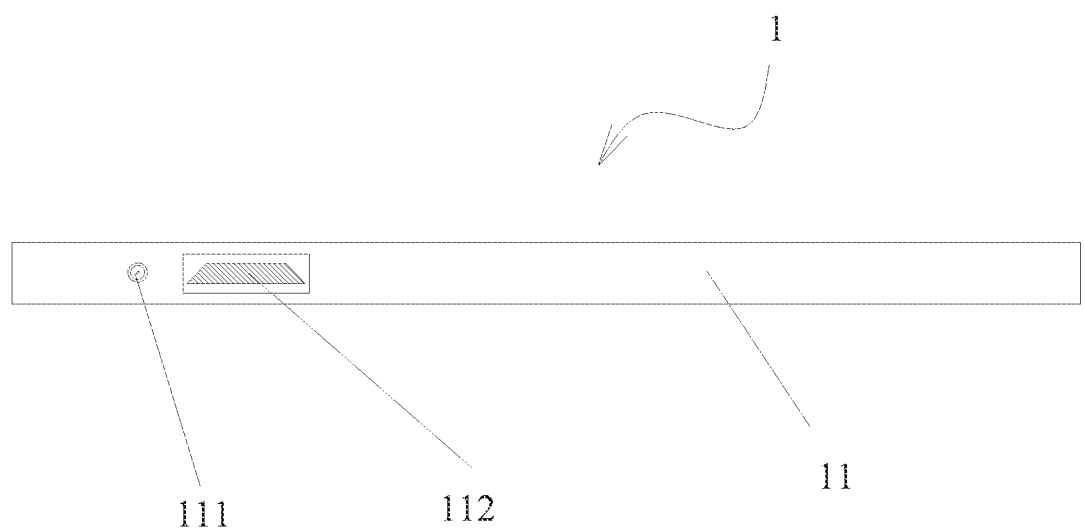
FIG. 4 illustrates a schematic bottom view of the notebook computer in accordance with the first embodiment of the present invention.

Detachable connection between the pivoted member 4 and the screen 1 could be achieved through various ways. Preferably, a first snap-fit part 41 can be provided on the pivoted member 4; correspondingly, a second snap-fit part 11 can be provided on the screen 1, as shown in FIGS. 2-4. Thus, the first snap-fit part 41 is snap-fitted to the second snap-fit part 11 while the keyboard 2 and the screen 1 are in the state of being connected to each other. A simple structure as well as an easy connection and an easy detachment between the pivoted member 4 and the screen 1 are provided by the form of snap-fit part, so the users' operation is facilitated.

The first snap-fit part 41 and the second snap-fit part 11 may be in any form by which the two parts are able to be snap-fitted to each other. Preferably, the first snap-fit part 41 is a snap-fit slot and the second snap-fit part 11 is the bottom-side part of the screen 1 in the present embodiment, as shown in FIGS. 2-4. The shape of the snap-fit slot is matched with the shape of the bottom-side part of the screen 1, so that the bottom-side part of the screen 1 is snap-fitted within the snap-fit slot while the keyboard 2 and the screen 1 are in the state of being connected to each other. In use, the bottom-side part of the screen 1 (the second snap-fit part 11) could be snap-fitted into the snap-fit slot on the pivoted member 4 (the first snap-fit part 41) when it is needed to connect the keyboard 2 with the screen 1 and use them. This kind of firm of snap-fit is pretty simple, as there is no need to provide any other snap-fitting parts on the screen 1 and the bottom-side part thereof forms the snap-fit part.

In addition, preferably, a backup power source (not shown) is provided in the keyboard 2, and a backup power source interface 411 connected to the output terminal of the backup power source is provided in the first snap-fit part 41 in the present embodiment, as shown in FIG. 2. Correspondingly, a power source receiving interface 111 connected to the host is provided in the second snap-fit part 11, as is shown in FIG. 4. The backup power source interface 411 is inserted and connected to the power source receiving interface 111 while the keyboard 2 and the screen 1 are in the state of being connected to each other. Thus, when the keyboard 2 and the screen 1 are in the state of being connected to each other, the backup power source interface 411 in the first snap-fit part 41 may be used to supply power to the host.

Also, preferably, a control circuit (not shown), e.g. a main board, is provided in the keyboard 2, and a keyboard data interface 412 connected to the control circuit is provided in the first snap-fit part 41 as shown in FIG. 2. Correspondingly, a host data interface 112 is provided in the second snap-fit part 11 as shown in FIG. 4; the keyboard data interface 412 is inserted and connected to the host data interface 112 while the keyboard 2 and the screen 1 are in the state of being connected to each other. Thus, the data transmission between the host and the keyboard 2 is achieved through the keyboard data interface 412 and the host data interface 112 while the keyboard 2 and the screen 1 are in the state of being connected to each other. Of course, data need to be transmitted between the host and the keyboard 2 through wireless connection while the keyboard 2 and the screen 1 are in the state of being separated from each other. In practice, in other embodiments of the present invention, data can be transmitted between the host and the keyboard 2 through wireless connection all the times whether the keyboard 2 and the screen 1 are in the state of being connected to or separated from each other.

More preferably, the above mentioned backup power source interface 411 and the keyboard data interface 412 in the first snap-fit part 41 can be integrated into one keyboard transmission interface (not shown in the figures). Correspondingly, the above mentioned power source receiving interface 111 and the host data interface 112 in the second snap-fit part 11 can be integrated into one host transmission interface (not shown in the figures). The keyboard transmission interface is inserted and connected to the host transmission interface while the keyboard 2 and the screen 1 are in the state of being connected to each other. Thus, the function of supplying power to the host and the function of transmitting data between the host and the keyboard 2 can both be achieved through the keyboard transmission interface and the host transmission interface while the keyboard 2 and the screen 1 are in the state of being connected to each other.

The notebook computer of the second embodiment of the present invention is substantially similar to the notebook computer of the first embodiment, except that the forms of the first snap-fit part 41 and the second snap-fit part 11 of the second embodiment are different from those of the first embodiment.

Figure 5:
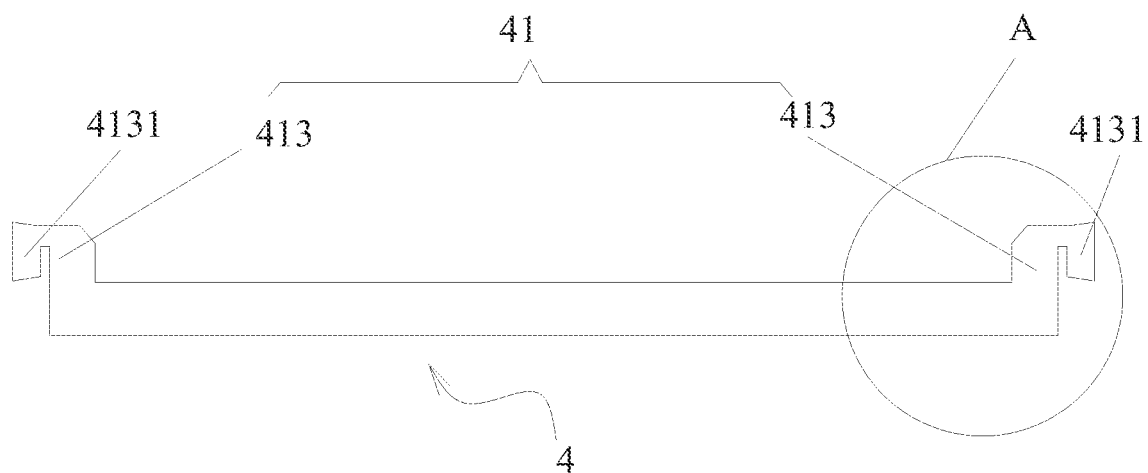
FIG. 5 illustrates a schematic top view of the pivoted member of the notebook computer in accordance with the second embodiment of the present invention.
Figure 6:
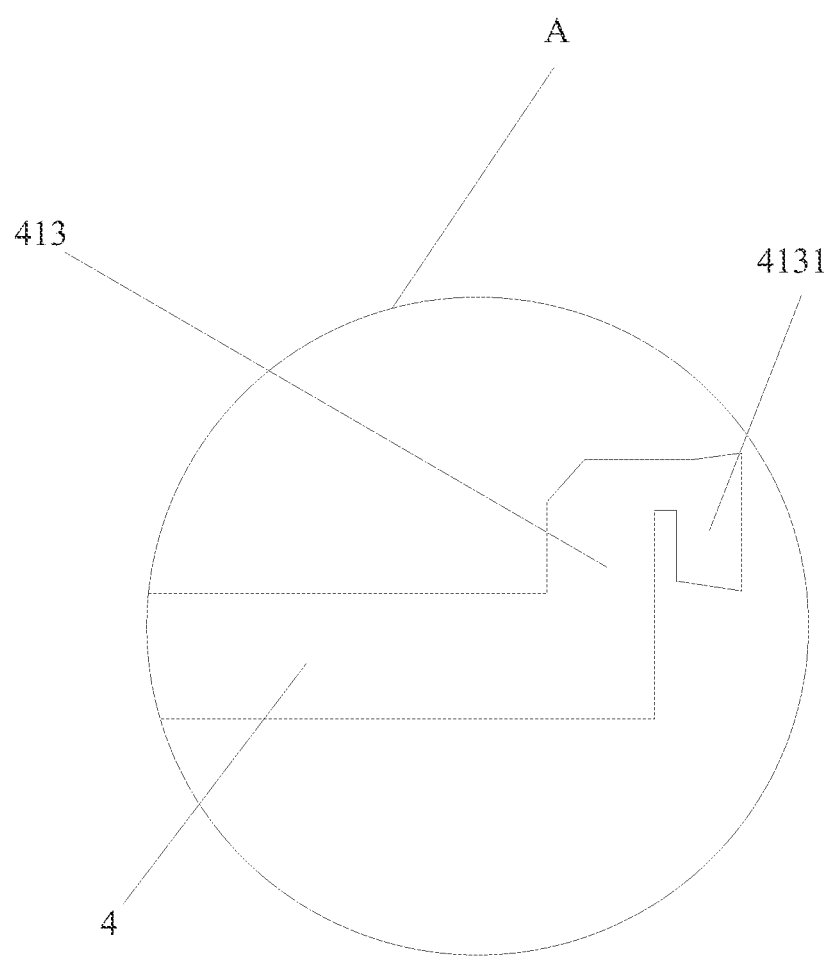
FIG. 6 illustrates a schematic enlarged view of part A in FIG. 5.
Figure 7:
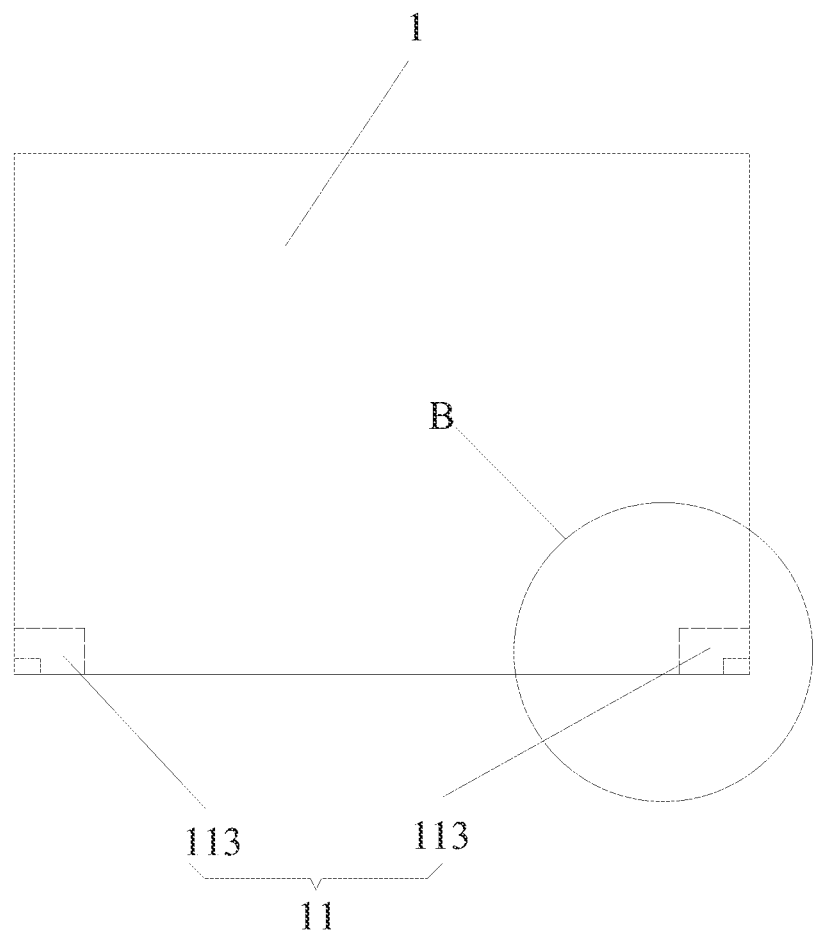
FIG. 7 illustrates a schematic front view of the notebook computer in accordance with the second embodiment of the present invention.
Figure 8:
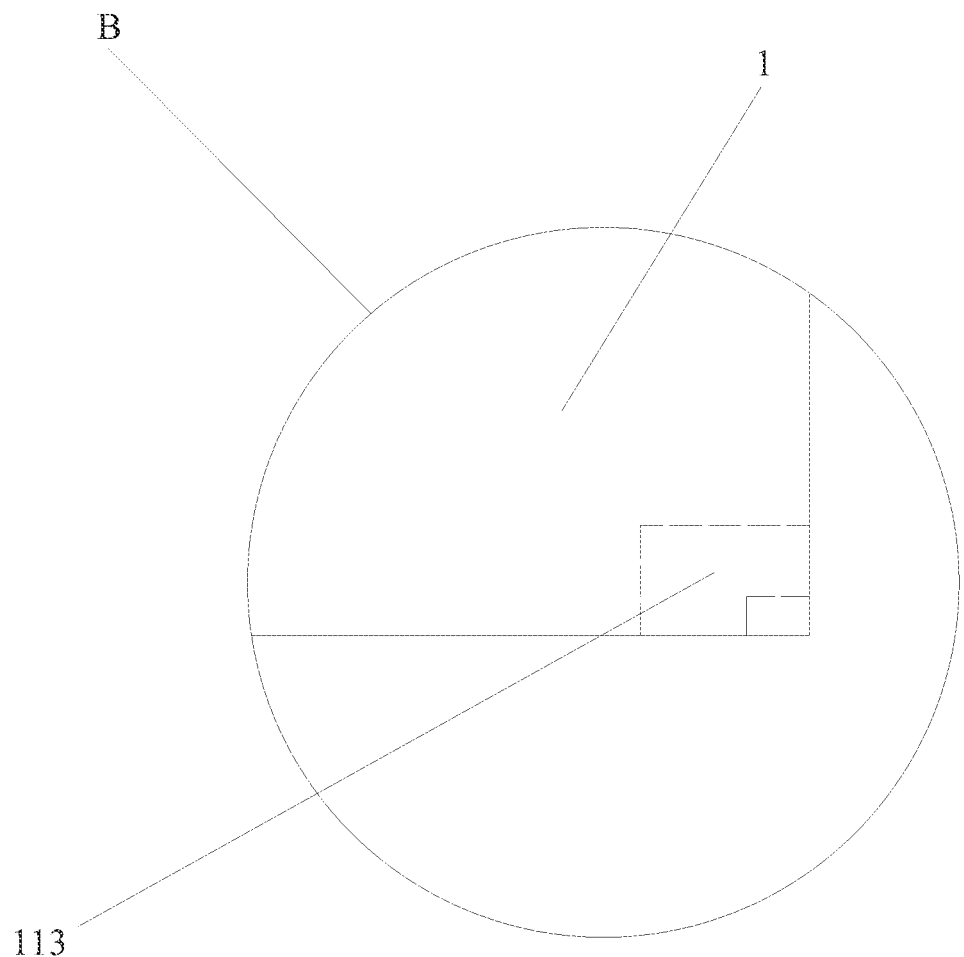
FIG. 8 illustrates a schematic enlarged view of part B in FIG. 7.
Figure 9:
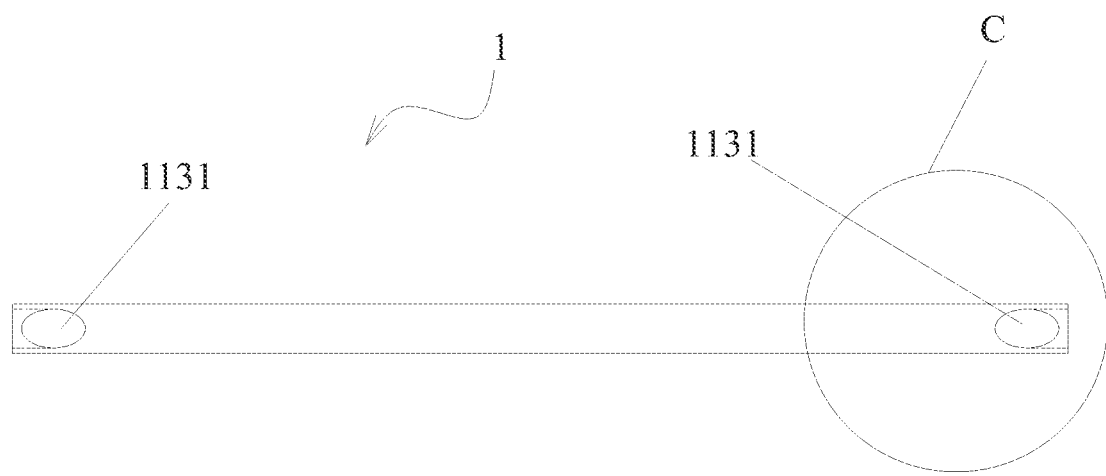
FIG. 9 illustrates a schematic bottom view of the notebook computer in accordance with the second embodiment of the present invention.
Figure 10:
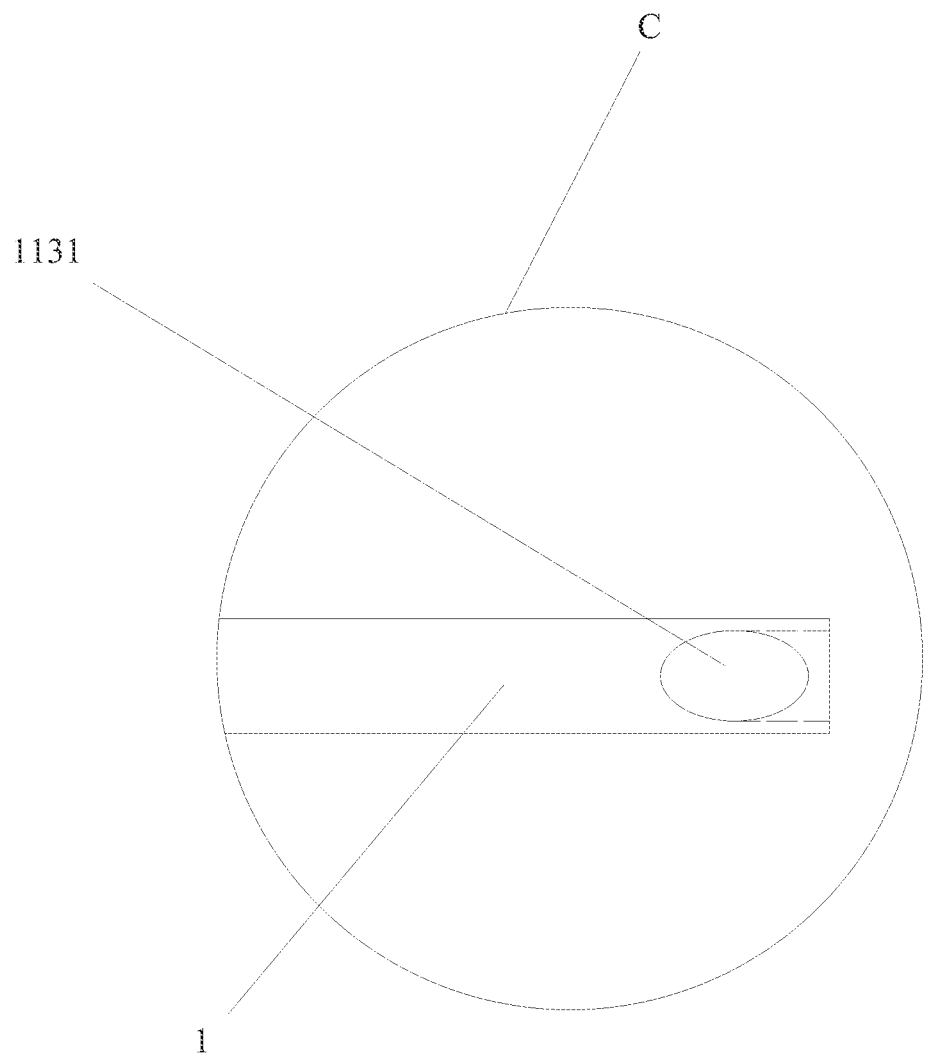
FIG. 10 illustrates a schematic enlarged view of part C in FIG. 9.
Figure 11:
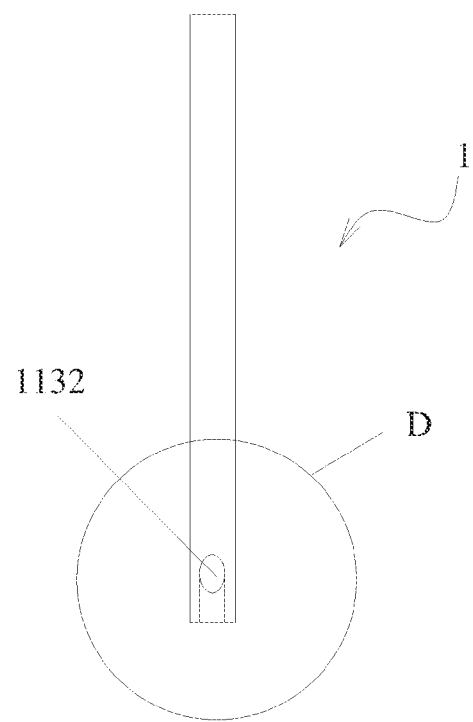
FIG. 11 illustrates a schematic side elevational view of the notebook computer in accordance with the second embodiment of the present invention.
Figure 12:
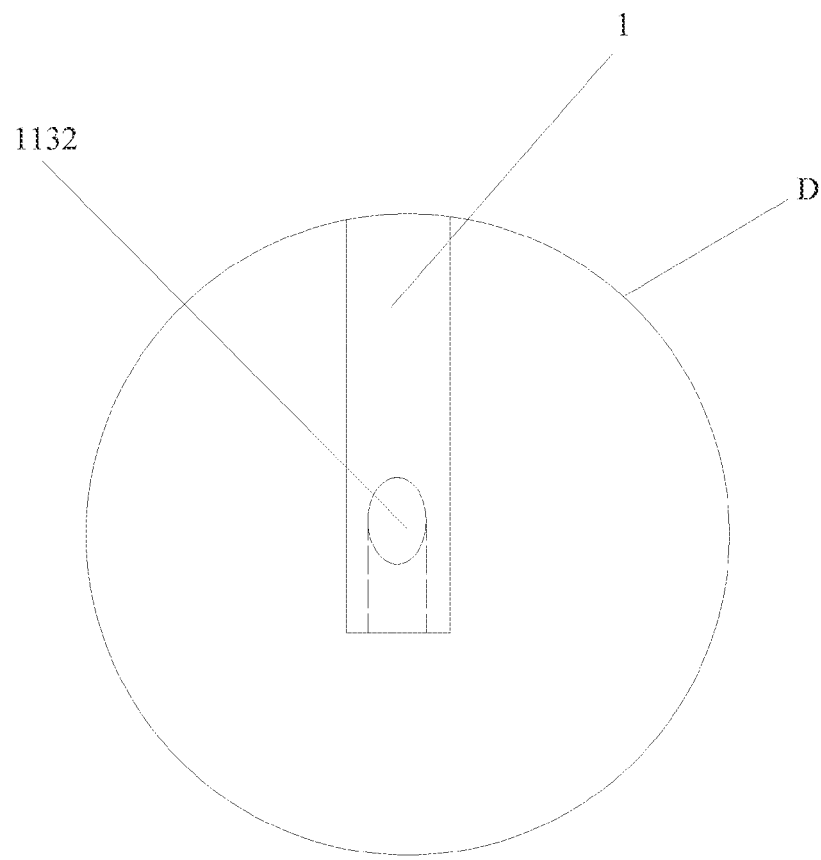
FIG. 12 illustrates a schematic enlarged view of part D in FIG. 11.

Specifically, the first snap-fit part 41 includes two projections 413 projecting radially from the two ends of the pivoted member 4 respectively, the projections 413 are made of elastic material, and the free ends of the two projections 413 are each provided with a hook 4131 with the two hooks 4131 facing away from each other, as shown in FIGS. 5-6. Correspondingly, the second snap-fit part 11 includes two L-shaped through-holes 113 provided at the two ends of the bottom-side part of the screen 1 respectively, the L-shaped through-hole 113 includes a first opening 1131 located on the bottom side of the screen 1 and a second opening 1132 located on the lateral side of the screen 1, as shown in FIGS. 7-12. Each of the projections 413 is snap-fitted into the respective L-shaped through-hole 113 and each of the hooks 4131 is hooked at the outside of the respective second opening 1132 while the keyboard 2 and the screen 1 are in the state of being connected to each other.

When it is needed to connect the keyboard 2 with the screen 1, the user has to align the projections 413 (the first snap-fit parts 41) on the pivoted member 4 with the first openings 1131 of the L-shaped through-holies 113 (the second snap-fit parts 11) on the screen 1, then insert the keyboard 2 toward the screen 1, at this time, the snap-fit of the screen 1 to the pivoted member 4 is achieved. When it is needed to detach the keyboard 2, the user has to press the two hooks 4131 with hands, and the projections 413 are bent inward so as to return into the L-shaped through-hole 113 and further disengaged from there. The operation of the user is facilitated much more by this form of snap-fit.

The notebook computer of the third embodiment of the present invention is substantially similar to the notebook computers of the first embodiment and the second embodiment, except that the forms of the first snap-fit part 41 and the second snap-fit part 11 of the third embodiment are different from those of the first and second embodiments.

Figure 13:
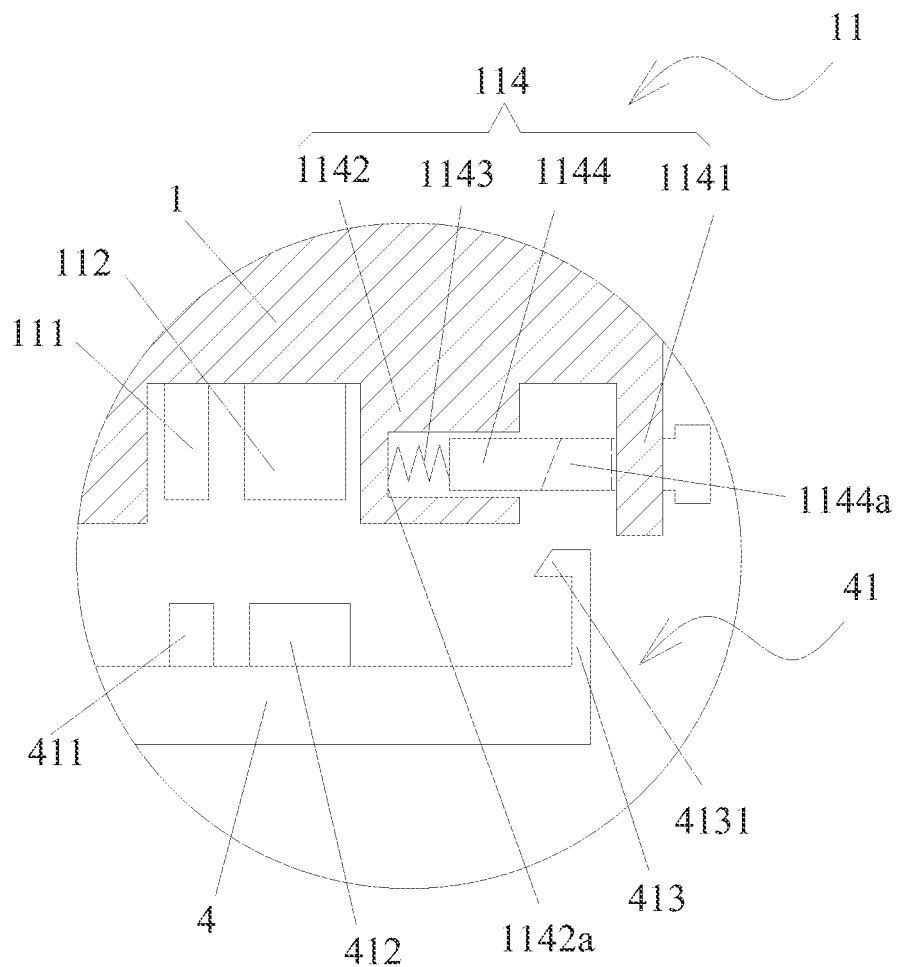
FIG. 13 illustrates a schematic structure view of the first snap-fit part and the second snap-fit part of the notebook computer according to the third embodiment of the present invention.

Specifically, as shown in FIG. 13, the first snap-fit part 41 includes two projections 413 projecting radially from the two ends of the pivoted member 4 respectively (one of which is shown in FIG. 13, the other projection has a same shape but is symmetrical with the shown projection), and the free ends of the two projections 413 are each provided with a hook 4131 with the two hooks 4131 facing toward each other. The second snap-fit part 11 includes two recesses 114 provided at the two ends of the bottom-side part of the screen 1 respectively (one of which is shown in FIG. 13, the other recess has a same shape but is symmetrical with the shown recess), wherein each of the recesses 114 includes a first wall 1141, a second wall 1142, a biasing means 1143 and snap-fit plate 1144. The first wall 1141 is a portion of the lateral-side part of the screen 1, as shown in FIG. 13. The second wall 1142 extends in parallel with the first wall 1141, with a groove 1142*a* opened toward the first wall 1141 provided in the second wall 1142. The biasing means 1143 is located in the groove 1142*a*, with one end fixedly connected to the groove 1142*a*. One end of the snap-fit plate 1144 is located within the groove 1142*a* and connected with the other end of the biasing means 1143, and the other end of the snap-fit plate 1144 passes through the first wall 1141 and extends out of the lateral-side part of the screen 1. A snap-fit hole 1144*a* is provided on the snap-fit plate 1144. While the keyboard 2 (not shown in the figures) and the screen 1 are in the state of being connected to each other, each of the projections 413 is snap-fitted into the respective snap-fit hole 1144*a* and each of the hooks 4131 is hooked at the surface of the respective snap-fit plate 1144.

When it is needed to connect the keyboard 2 with the screen 1, the user has to align the projections 413 (the first snap-fit parts 41) on the pivoted member 4 with the recesses 114 (the second snap-fit parts 11) on the screen 1, then insert the keyboard 2 toward the screen 1. During the process of inserting the keyboard 2 toward the screen 1, the projections 413 push the snap-fit plates 1144 in the snap-fit holes 1144*a* against the biasing means 1143, and after the hooks 4131 of the projections 413 have passed through the snap-fit holes 1144*a*, the biasing means 1143 enable the snap-fit plates 1144 to move backward, then the two hooks 4131 are each hooked at the surface of the respective snap-fit plate 1144, thus the inserting process is completed. When it is needed to detach the keyboard 2, the user has to press the ends of the two snap-fit plates 1144 extending out of the lateral-side parts of the screen 1 with hands, so as to push the snap-fit plates 1144 against the biasing means 1143, so that the hooks 4131 can pass though the snap-fit holes 1144*a* smoothly, at this time, the keyboard 2 and the screen 1 can be relatively moved apart such that the projections 413 (the first snap-fit part 41) are disengaged from the recesses 114 (the second snap-fit part 42). The operation of the user is facilitated much more by this form of snap-fit.

Similar to the first embodiment, the present embodiment further comprises a backup power source interface 411 and a power source receiving interface 111 as further shown in FIG. 13. In the present embodiment, the backup power source interface 411 is provided on the pivoted member 4 and the power source receiving interface 111 is provided in one of the recesses 114, near the other side of the second wall 1142. Of course, the backup power source interface 411 and the power source receiving interface 111 can be provided at the appropriate positions on the pivoted member 4 and the screen 1 respectively in practice.

Likely, similar to the first embodiment, the present embodiment further comprises a keyboard data interface 412 and a host data interface 112 as shown in FIG. 13. In the present embodiment, the keyboard data interface 412 is provided on the pivoted member 4 and the host data interface 112 is provided in one of the recesses 114, near the other side of the second wall 1142. Of course, the keyboard data interface 412 and the host data interface 112 can be provided at the appropriate positions on the pivoted member 4 and the screen 1 respectively in practice.

In addition, preferably, in the first to third embodiments, while the keyboard 2 and the screen 1 are in the state of being connected to each other, the keyboard 2 and the screen 1 can rotate relative to each other, and a rotation limiter (not shown in the figures) is provided on the keyboard 2 or the screen 1 such that the range of the angle between the screen 1 and the keyboard 2 is 0-180 degree. The rotation limiter may be in any appropriate form such as a boss etc.

In addition, preferably, e.g. in the first embodiment, the notebook computer further comprises a bracket 3 such that the bracket 3 supports the screen 1 while the keyboard 2 and the screen 1 are in the state of being separated from each other, as may be seen back to FIG. 1. Thus, when the user separates the keyboard 2 from the screen 1 and uses the screen 1, the screen 1 may be supported on a horizontal surface for seeing a movie, showing pictures etc.

The bracket 3 may be detachably connected with the screen 1 and mounted on the screen 1 when it is needed. However, preferably, the bracket 3 is articulated on the screen 1 as shown in FIG. 1.

More preferably, a rotating limiter (not shown in the figures) may be provided on the screen 1 or the bracket 3, such that the range of the angle between the bracket 3 and the screen 1 is 0-90 degree when the bracket 3 and the screen 1 are rotating relative to each other.

In addition, more preferably, the notebook computer can further comprise a bracket locking means (not shown in the figures), which is used to fix the bracket 3 to the screen 1 while the keyboard 2 and the screen 1 are in the state of being connected to each other. That is, when the keyboard 2 and the screen 1 are connected with each other, the support of the bracket 3 is not necessary so the bracket locking means may be used to lock it on the screen 1 to prevent it from affecting the operation.

Preferably, the bracket 3 is made of heat dispersing material to help the host in the screen 1 to disperse heat.

In addition, preferably, a touch screen operation switching key (not shown) may be provided on the keyboard 2 for canceling or starting the touching operation function of the screen 1. While a keyboard operation switching key (not shown) may be provided on the screen 1 for canceling or starting the operation function of the keyboard 2. Thus, the operation function of the keyboard 2 or the screen 1 can be canceled through these two switching key in the case of different needs so as to avoid confusion in operation. In addition, a touch panel may be provided on the top surface of the keyboard 2 to facilitate the user to perform mouse-operation through touching the touch panel. Also a USB data interface may be provided on the side of the keyboard 2 to facilitate the user to perform data transmission. The USB data interface may transmit data with the host in the screen 1 through the wired ways, e.g. the connection with the host is achieved through the above mentioned keyboard data interface 412 and the host data interface 112.

The present invention has been described through the above-mentioned embodiments. However, it will be understand that the above-mentioned embodiments are for the purpose of demonstration and description and not for the purpose of limiting the present to the scope of the described embodiments. Moreover, those skilled in the art could appreciated that the present invention is not limited to the above mentioned embodiments and that various modifications and adaptations in accordance of the teaching of the present invention may be made within the scope and spirit of the present invention. The protection scope of the present invention is further defined by the following claims and equivalent scope thereof.

What is claimed is:

1. A notebook computer comprising:
a screen configured to be operable via touching;
a host integrated in the screen;
a detachable keyboard connected with the screen, wherein, while the keyboard and the screen are connected to each other, the keyboard can rotate relative to the screen, and wherein a rotation limiter is provided on the keyboard such that a range of an angle between the screen and the keyboard is from 0 degrees to 180 degrees;
a pivoted member which is provided at the keyboard to be connected with the screen; and
a locking member for locking the pivoted member with the screen while the keyboard and the screen are connected to each other.

2. The notebook computer according to claim 1, wherein:
a first snap-fit part is provided on the pivoted member;
a second snap-fit part is provided on the screen; and
the first snap-fit part is fitted to the second snap-fit part while the keyboard and the screen are connected to each other.

3. The notebook computer according to claim 2, wherein:
a backup power source is provided in the keyboard, and a backup power source interface connected to an output terminal of the backup power source is provided in the first snap-fit part;
a power source receiving interface connected to the host is provided in the second snap-fit part; and
the backup power source interface is inserted and connected to the power source receiving interface while the keyboard and the screen are connected to each other.

4. The notebook computer according to claim 2, wherein:
a control circuit is provided in the keyboard, and a keyboard data interface connected to the control circuit is provided in the first snap-fit part;
a host data interface connected to the host is provided in the second snap-fit part; and
the keyboard data interface is inserted and connected to the host data interface while the keyboard and the screen are connected to each other.

5. The notebook computer according to claim 2, wherein:
a backup power source and a control circuit are provided in the keyboard, and a keyboard transmission interface connected to both an output terminal of the backup power source and the control circuit is provided in the first snap-fit part;
a host transmission interface connected to the host is provided in the second snap-fit part; and
the keyboard transmission interface is inserted and connected to the host transmission interface while the keyboard and the screen are connected to each other.

6. The notebook computer according to claim 2, characterized in that:
the first snap-fit part is a snap-fit slot;
the second snap-fit part is the bottom-side part of the screen;
the bottom-side part of the screen is snap-fitted within the snap-fit slot while the keyboard and the screen are connected to each other.

7. The notebook computer according to claim 2, characterized in that:
the first snap-fit part includes two projections projecting radially from two ends of the pivoted member respectively, the projections are made of elastic material, and free ends of the two projections are each provided with a hook with the two hooks facing away from each other;
the second snap-fit part includes two L-shaped through-holes provided at two ends of the bottom-side part of the screen respectively, the L-shaped through-hole includes a first opening located on the bottom side of the screen and a second opening located on the lateral side of the screen;
each of the projections is snap-fitted into the respective L-shaped through-hole and each of the hooks is hooked at the outside of the respective second opening while the keyboard and the screen are in the state of being connected to each other.

8. The notebook computer according to claim 2, characterized in that:
the first snap-fit part includes two projections projecting radially from two ends of the pivoted member respectively, and free ends of the two projections are each provided with a hook with the two hooks facing toward each other;
the second snap-fit part includes two recesses provided at two ends of the bottom-side part of the screen respectively, wherein each of the recesses includes:
a first wall, which is a portion of the lateral-side part of the screen;
a second wall, which extends in parallel with the first wall, with a groove opened toward the first wall provided in the second wall;
a biasing means, which is located in the groove, with one end fixedly connected to the groove; and
a snap-fit plate, with one end of the snap-fit plate located within the groove and connected with the other end of the biasing means, and the other end of the snap-fit plate passing through the first wall and extending out of the lateral-side part of the screen, wherein a snap-fit hole is provided on the snap-fit plate,
while the keyboard and the screen are in the state of being connected to each other, each of the projections is snap-fitted into the respective snap-fit hole and each of the hook is hooked at the surface of the respective snap-fit plate.

9. The notebook computer according to claim 1, wherein data are transmitted between the host and the keyboard through a wireless connection when the keyboard and the screen are connected and when the keyboard and the screen are separated.

10. The notebook computer according to claim 1, wherein:
a touch screen operation switching key is provided on the keyboard for canceling or starting a touching operation function of the screen; and
a keyboard operation switching key is provided on the screen for canceling or starting a operation function of the keyboard.

11. The notebook computer according to claim 1, wherein a touch panel is provided on the top surface of the keyboard, and a USB data interface is provided on the side of the keyboard.

12. A notebook computer comprising:
a screen configured to be operable via touching;
a host integrated in the screen;
a detachable keyboard connected with the screen, wherein, while the keyboard and the screen are connected to each other, the keyboard can rotate relative to the screen, and wherein a rotation limiter is provided on the keyboard such that a range of an angle between the screen and the keyboard is from 0 degrees to 180 degrees; and
a bracket that supports the screen while the keyboard and the screen are separated from each other.

13. The notebook computer according to claim 12, wherein the bracket is articulated on the screen.

14. The notebook computer according to claim 13, further comprising a rotating limiter that is provided on the screen such that a range of an angle between the bracket and the screen is from 0 degrees to 90 degrees.

15. The notebook computer according to claim 13, further comprising a bracket locking means, which is used to fix the bracket to the screen while the keyboard and the screen are connected to each other.

16. The notebook computer according to claim 13, further comprising a rotating limiter that is provided on the bracket such that a range of an angle between the bracket and the screen is from 0 degrees to 90 degrees.

17. The notebook computer according to claim 12, wherein the bracket is detachably connected with the screen.

18. The notebook computer according to claim 12, wherein the bracket is made of heat dispersing material.

* * * * *